Figure 4:
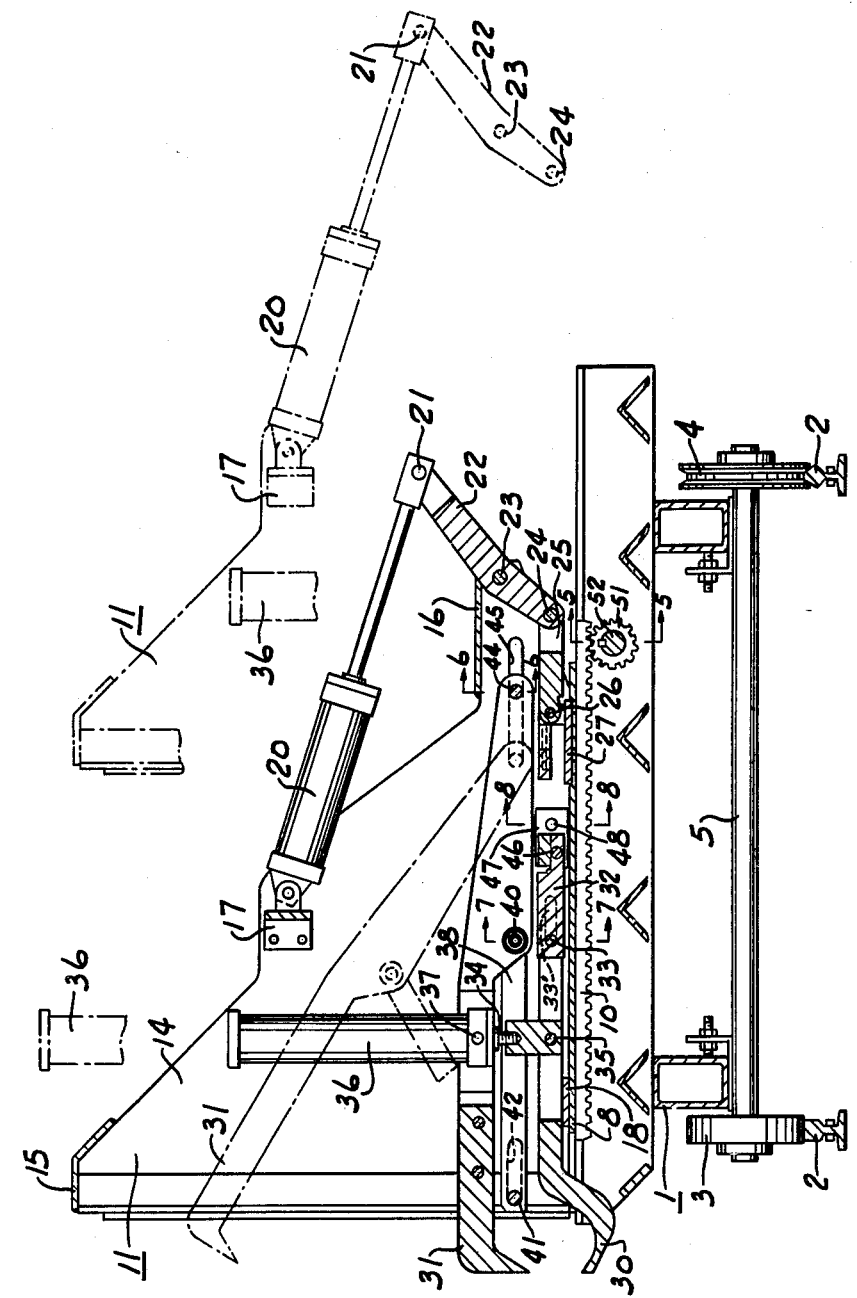

May 14, 1963
A. SHASHATY
3,089,523
COMBINATION BOARD AND LOG HOLDING KNEE
DOG STRUCTURE OF A SAWMILL
Filed Feb. 15, 1961
4 Sheets-Sheet 1
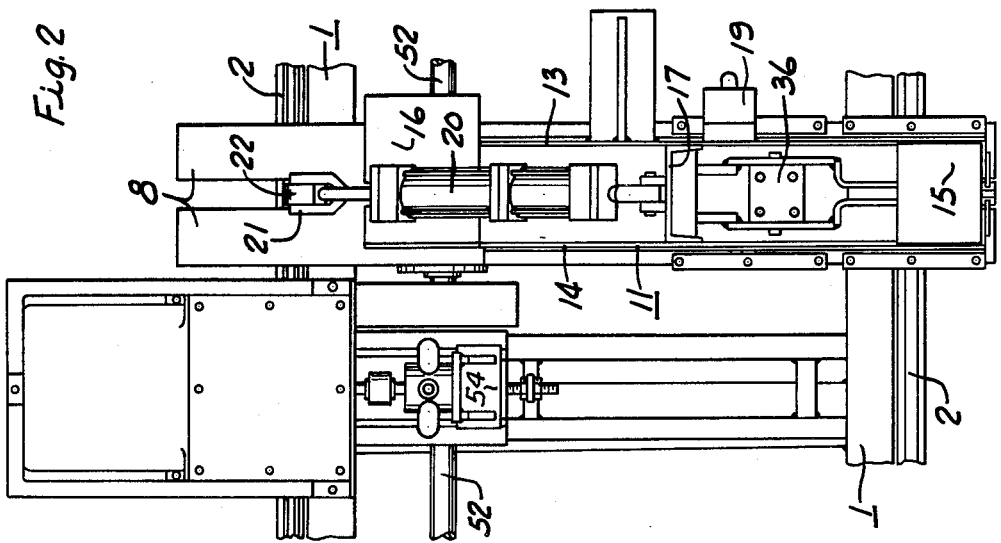
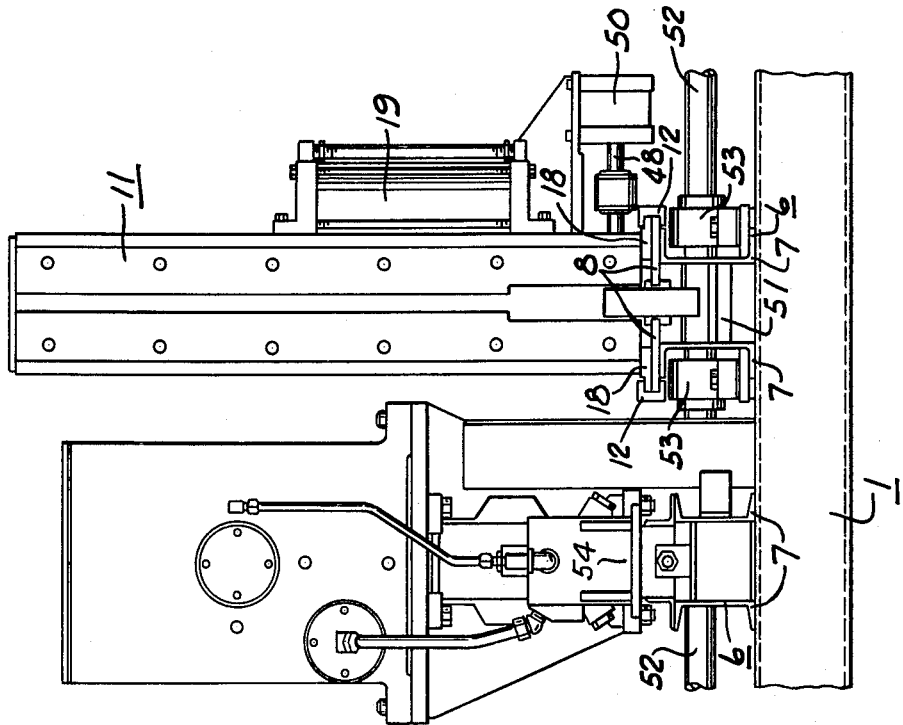
INVENTOR.
ALEXANDER SHASHATY
BY
HIS ATTORNEY May 14, 1963  A. SHASHATY  3,089,523
COMBINATION BOARD AND LOG HOLDING KNEE
DOG STRUCTURE OF A SAWMILL
Filed Feb. 15, 1961  4 Sheets-Sheet 2
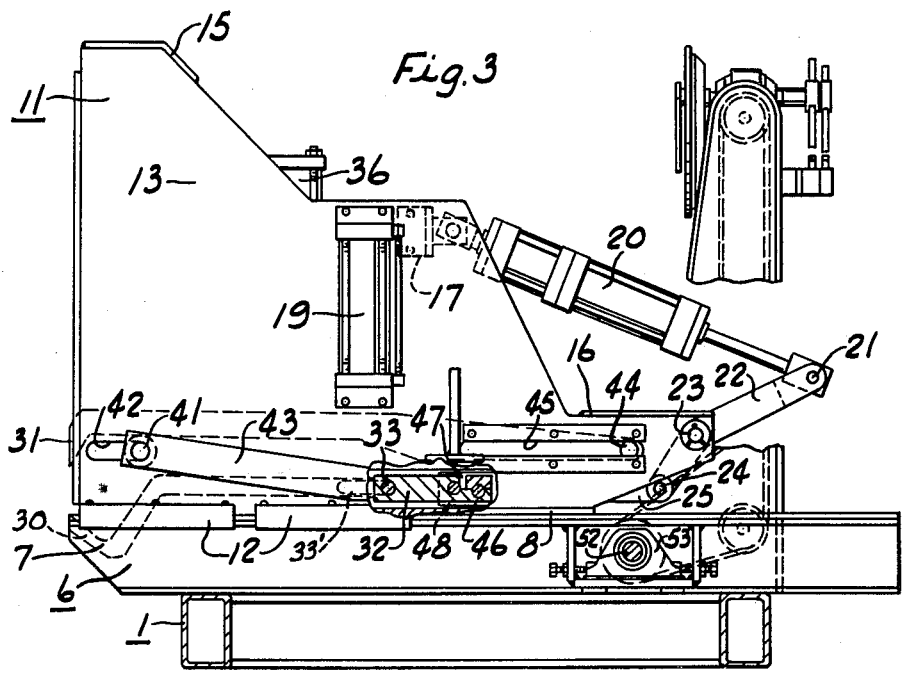
Fig. 3
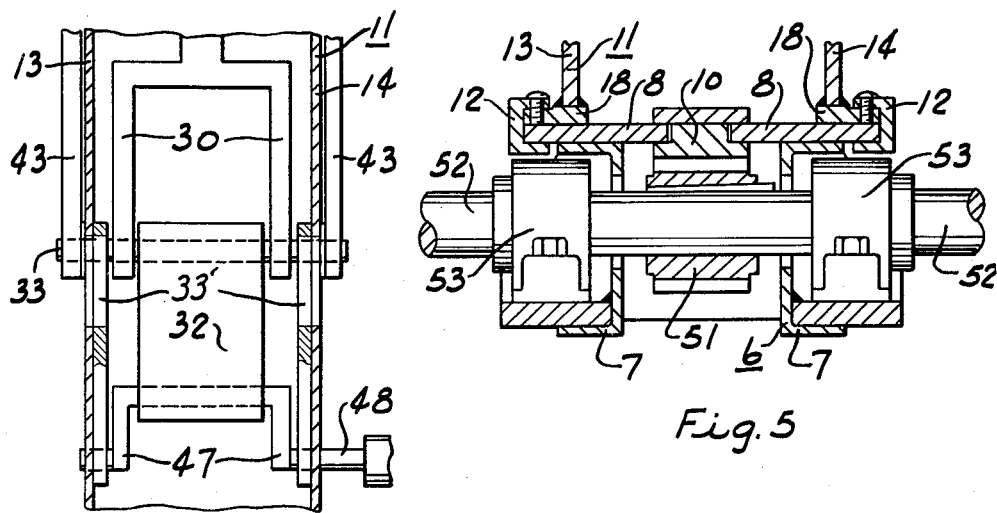
Fig. 9
Fig. 5
INVENTOR.
ALEXANDER SHASHATY
BY William D. Carothers
HIS ATTORNEY INVENTOR.
ALEXANDER SHASHATY
BY William D. Carothers
HIS ATTORNEY May 14, 1963

A. SHASHATY 3,089,523

COMBINATION BOARD AND LOG HOLDING KNEE
DOG STRUCTURE OF A SAWMILL

Filed Feb. 15, 1961

4 Sheets—Sheet 4

INVENTOR.
ALEXANDER SHASHATY
BY William D. Carothers

HIS ATTORNEY

United States Patent Office 3,089,523
Patented May 14, 1963

3,089,523
COMBINATION BOARD AND LOG HOLDING
KNEE DOG STRUCTURE OF A SAWMILL
Alexander Shashaty, Youngstown, Ohio, assignor to Wm.
K. Stamets Company, Pittsburgh, Pa., a corporation of
Pennsylvania
Filed Feb. 15, 1961, Ser. No. 89,426
15 Claims. (Cl. 143—126)

This invention relates generally to saw mills and more particularly to a log holding knee dog structure.

The principal object of this invention is the provision of a log knee having a combination dog structure formed by one upper and lower dog lever pivotally connected relative to the knee and interconnected with upper and lower links so as to control the movement of the dog bites to extend the dog levers for use as a tong dog for holding a log and contract as a board dog for holding a squared timber from which half inch boards may be cut.

Another object is the provision of pivotally supported dogs for grasping and holding an object such as a squared timber wherein the dogs when retracted recede to hold the last half inch board and when extended projects further into the operating area in front of the knee to hold a log which action is controlled by the pivotal connection and linkage of the upper and lower dog levers and interconnecting links together with a servomotor operating a fixed throw crank to move the dogs from their retracted or board holding position to their log holding position.

Another object is the provision of pivotally connected and supported dogs which through one fluid actuated cylinder may be expanded and then brought together to engage and grip the object such as a log. This contemplates the pivotal connection between the opposing dog levers and links with the knee and their relative sliding connections. These dog levers are interconnected with toggles and links which when actuated cause the chiseled biting point of the upper dog to travel with relatively straight line motion to be most effective in cooperating with the lower dog to grip and hold the board even though cut to one half inch thickness.

Another object is the provision of a combination log and board holding dog structure wherein the links and dog levers are proportioned to provide substantially straight line motion to the upper dog over its full travel without the use of guides. The knee supporting this dog structure has spaced vertical sides which are provided with spaced pairs of slots, one pair forward, one pair intermediate and one pair aft in the knee sides and in corresponding alignment with each other, a lower dog lever pivotally connected to the intermediate slots, an upper dog lever having a downwardly projecting bite adjacent its outer end and an intermediate pivot and at its inner end a transverse pivot pin riding in the aft slots. The four slots having pivots slidable therein with an upper and lower link connected thereto. The opposite end of said upper link being connected to the intermediate pivot of said upper dog lever and the lower link being connected to a pivot on said lower dog lever and a double acting jack having its piston pivoted to the lower dog lever and its cylinder pivoted to the upper dog lever to expand and contract said dog bites, said dog bites following a path limited by the dimensions of said links and the locations of said slots and pivots.

Another object is the provision of a pitman link pivotally connected to the inner end of the lower dog lever and a crank having a wrist pin and crank shaft with the wrist pin pivotally connected to the opposite end of said pitman link to extend and retract the dog bites on the upper and lower dog levers when said crank is turned in opposite directions.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 on Sheet 1 is a front view in elevation of a log holding knee dog structure of a saw mill.

FIG. 2 on Sheet 1 is a plan view of the log holding knee dog structure shown in FIG. 1.

FIG. 3 on Sheet 2 is an end view in elevation of the log holding knee dog structure shown in FIG. 1.

FIG. 4 on Sheet 3 is a sectional view of the log holding knee dog structure shown in FIG. 3.

FIG. 5 on Sheet 2 is a view taken on the line 5—5 of FIG. 4.

Figure 6:
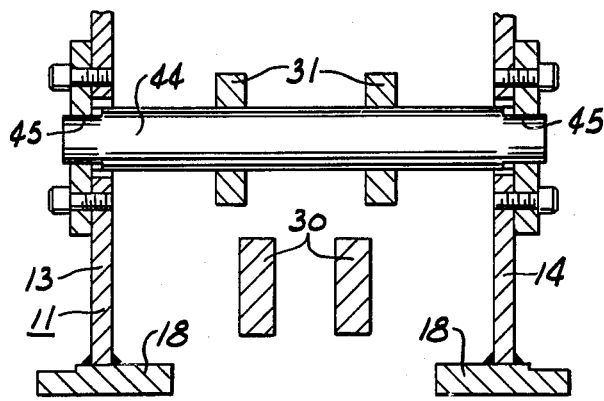

FIG. 6 on Sheet 4 is a sectional view taken on the line 6—6 of FIG. 4.

Figure 7:
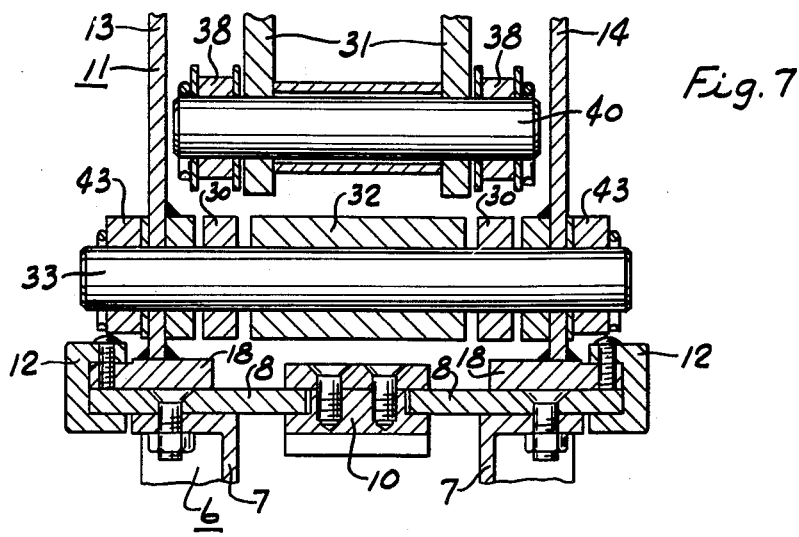

FIG. 7 on Sheet 4 is a sectional view taken on the line 7—7 of FIG. 4.

Figure 8:
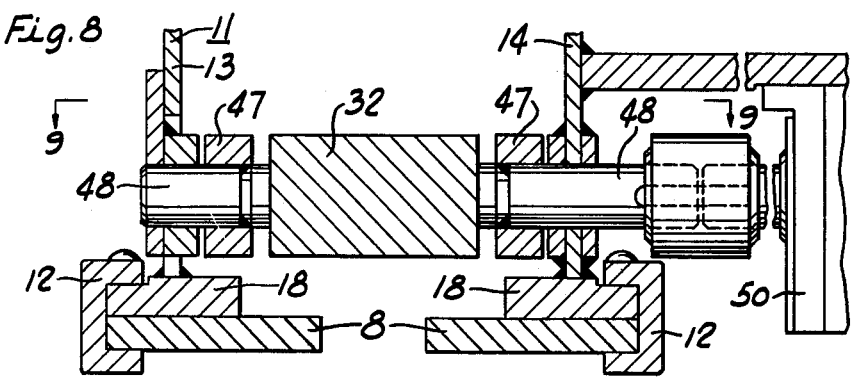

FIG. 8 on Sheet 4 is a sectional view taken on the line 8—8 of FIG. 4.

FIG. 9 on Sheet 2 is a horizontal sectional view taken on the line 9—9 of FIG. 8.

Referring to FIGS. 1 to 4 of the drawings the saw mill illustrated is indicated by the carriage 1 movable longitudinally on the track 2 by means of the wheels 3 and 4 connected by the axles 5 journaled to the under side of the carriage. As in structures of this character the wheel 3 is flat and the wheel 4 is double-flanged and the rails of the track 2 are correspondingly shaped so that the carriage will maintain longitudinal movement along the track without lateral displacement. The power means to move the carriage is not illustrated.

Mounted on the carriage 1 is a set of three transverse head blocks 6 each spaced from each other. Each head block comprises a pair of spaced channel members 7 that extend over the full width of the carriage 1 and have mounted on their upper surfaces stationary track plates 8 which form retainers for supporting the rack member 10 and also serve as a wear plate for the logs resting on the surface thereof in front of the knee members 11. Thus each head block slidably supports its knee member 11 on the upper surface of the track members 8 and is held in sliding relation by the gib members 12. Each knee comprises side plates 13 and 14 which are secured to each other by the transverse plates 15 and 16 and the channel member 17. The bottom of the side plates 13 and 14 is provided with the slides 18 that rest directly on the tracks 8 and support the gibs 12 which slide back and forth with the knee. To accommodate a taper in the log and as best shown in FIGS. 3 and 4 each knee is movable relative to the rack member 10 by means of the cylinder 20 pivotally connected to the cross bracket 17 and its piston is connected through the pin 21 to the bell crank 22, its fulcrum being illustrated at 23 on the knee and its opposite end being pivotally connected by the pin 24 to the link 25. The opposite end of the link 25 is connected by the pin 26 to the rack retainer plate 27. It is secured relative to the rack. Thus when the cylinder 20 is extended or retracted the knee is moved relative to the rack. However, the cylinder 20 being a combination pneumatic hydraulic cylinder controlled by solenoid valves locks the knee relative to the rack 10 and causes the knee to move with the rack during the normal operation of the knees in sawing boards from a log or timber. The knee is shown to be retracted by the dotted lines to the right in FIG. 4.

The cylinder 20 is provided with an air-oil pressure tank indicated at 19 and attached to either of the side plates of the knee as illustrated in FIGS. 1, 2, and 3.

When a log is placed on the wearing plates 8 in front of the knees which are retracted by means of the rack it is sometimes necessary to pre-position these knees so that the taper of the log is properly taken into account to avoid any waste in the cutting of the log. Thus each knee must be independently movable relative to its rack to compensate for this taper or for any bend or surface misshape of the log. Once the knees are properly positioned relative to the racks to hold the log in the proper relation for the saw then the cylinders 20 with hydraulic fluid on one side and air pressure on the other side lock the knees relative to the rack so that the knees and rack will move as a unit member.

As shown in FIG. 4 each knee provides a lower dog 30 and an upper dog 31 which have upwardly and downwardly extending teeth or chisel points for the purpose of grasping the log or squared timber to be sawed. The lower dog lever extends rearwardly to a bifurcated section that is on opposite sides of the locking link 32 being pivotally secured thereto by the pin 33. This pin operates in the oppositely disposed intermediate slots 33' in the sides 13 and 14 as shown in FIG. 9. A block on the end of the piston 34 is also placed between the bifurcated section of the lower dog and is pivoted thereto by pin 35. The piston 34 operates in the cylinder 36 which has oppositely extending pins 37 that are pivotally received in the bifurcated section of the upper dog member 31. If the cylinder 36 is expanded the pins 37 lift the upper dog member 31 to the position shown in dotted lines thereby opening the dogs. In order to provide the proper movement for the upper dog a toggle link 38 is pivotally secured to the upper dog lever by the pin 40 and its opposite end has the pin 41 that rides in the slots 42 of the plates 13 and 14 and each outer end of the pin 41 is pivotally secured to one end of a tie link 43 which is outside of each of the knee plates 13 and 14 having its opposite end pivoted to the pin 33 on the lower dog lever 30. The rear end of the upper dog lever 31 has the pin 44 attached thereto which slides longitudinally in the slots 45 of the side plates 13 and 14 of the knee. Thus by means of these toggle and tie links and slots the movement of the dog levers in separating the coming together following substantially a straight line which slopes slightly outwardly as would be drawn from the position of the upper dog shown in dotted lines to the position shown in full lines. This is accomplished without the use of guides for the upper dog 31.

As shown in FIG. 4 both dogs are extended in full lines for grasping a log.

The locking link 32 has the pin member 46 journaled therein and which extends outwardly on both sides of the lock link and is provided with a crank arm 47 on each side thereof which crank arms are secured to the rotary shaft which is indicated at 48. The shaft 48 functions as the fixed pivot member for the lower and upper dog levers and their interconnecting links. The shaft 48 as shown in FIG. 1 extends outwardly to the side of the knee and is connected by a coupling to the shaft of the rotary air motor 50 as shown in FIGS. 1 and 3. Thus by energizing the rotary air motor in opposite directions one may throw the crank 47 and the link therewith to extend the lower and upper dog members 30 and 31 to grasp a log which position is shown in FIG. 4. The pin 46 lying below the pin 33 and the shaft center 48 in either position of the link 32 as shown in FIGS. 3 and 4 provides a past dead center lock for the link 32 in either position. In this way the dog members may be extended and automatically locked for operating on a log or retracted and locked to operate on a board as in the position illustrated in FIG. 3 when it is necessary to hold the last board for cutting boards as thin as one-half inch. It will be noted that the point of the lower dog lies below the surface of the stationary track members 8 so as to be completely out of contact with the log resting on these wearing plates when the dogs are open. When the dogs are brought together and the upper dog 31 contacts the log and bites into it and the cylinder 36 continues to close it lifts the lower dog 30 into the log grasping the same for sawing boards therefrom. Ordinarily the log is round and it would of course be free from contact of the upper dog 31. The rotary air motor 50 may be operated from a control stand (not shown) and once the dogs are moved outwardly or inwardly the link 32 thus locks the position of the dogs in that it falls slightly below dead center of the pivotal connections.

The rack 10 has its teeth on the underside thereof which engage with the pinion 51 found on the set shaft 52 that is journaled in the bearings 53 supported by each of the head blocks 6 as shown in FIGS. 1 and 2.

A reversible motor and lock mechanism 54 (FIGS. 1 and 2) is connected to drive the set shaft 52 in opposite directions for feeding the knee back and forth on the head block 6.

I claim:

1. A log holding knee dog structure comprising a pair of spaced rails, a knee having spaced vertical sides and mounted to slide along said rails in handling a log, spaced horizontal forward and intermediate and aft pairs of slots, one slot of each pair in each of said sides, each pair of slots being positioned in succession in said knee sides, a lower dog lever between said rails and plates having an upwardly projecting log bite adjacent its outer end and a transverse pivot pin adjacent its inner end, said lower dog lever pivot pin riding in said intermediate slots, an upper dog lever having a downwardly projecting log bite adjacent its outer end and an intermediate transverse pivot and a transverse pivot pin adjacent its inner end, said last mentioned upper dog lever pivot pin riding in said aft slots, a transverse fore pivot slidable in the fore slots, a lower and an upper link on each end of said fore pivot, said lower links connected to said pivot on said lower dog lever, said upper links connected to said intermediate pivot on said upper dog lever, means to hold said transverse pivot pin in a selected end of said intermediate slots, a double-acting jack having its piston directly pivoted to said lower dog lever and its cylinder directly pivoted to said upper dog lever to expand and contract said dog bites.

2. The knee dog structure of claim 1 characterized in that said upper dog lever is also disposed between said sides and said upper links are between said sides forming said knee and said lower links are outside said knee.

3. The knee dog structure of claim 1 characterized in that the expansion of said jack determines the height of the movement of said upper dog lever.

4. The knee dog structure of claim 1 characterized in that said upper and lower links and dog levers are proportioned to produce a substantially straight line motion of the upper dog over its full travel without the use of guides.

5. The knee dog structure of claim 1 characterized in that said double-acting jack connections with said upper and lower dog levers are intermediate the lengths of said links and said lower dog lever is free to move up to contact the log after the upper dog has engaged the log.

6. The knee dog structure of claim 1 characterized in that said means to hold said transverse pivot pin in a selected end of said intermediate slot comprises a pitman link pivoted at one end to said lower dog lever pivot pin, a crank having a wrist pin and crank shaft, said wrist pin pivotally connected to the other end of said pitman link, said dog levers being extended and retracted when said crank shaft is rotated in opposite directions.

7. The knee dog structure of claim 6 characterized in that said pitman link drops past dead center at each end of its stroke to lock the retracted and extended positions of said dog levers.

8. The knee dog structure of claim 6 characterized in that the length between said intermediate and transverse pivot pin of said upper dog lever is greater than the length of said pitman link and crank when said dog levers are extended.

9. The knee dog structure of claim 6 characterized by a motor to drive said crank shaft in opposite directions.

10. The knee dog structure of claim 9 characterized in that said motor is an air motor and retains said crank shaft in opposite positions.

11. A log holding dog lever structure consisting of a knee including connected spaced vertical plates each having a front log engaging face, three pairs of horizontal slots with one slot of each pair in each plate, said pairs of slots being successively positioned in said plates at forward and intermediate and aft positions, a lower dog lever having an upwardly projecting log bite at its forward end and a transverse pivot pin riding in said intermediate slots, an upper dog lever having a downwardly projecting log bite at its forward end and a transverse pivot pin riding in said aft slots, at least two links pivotally connected to a pivot pin riding in said forward slots, one link having its other end pivoted to the middle part of said upper dog lever and the other link pivoted to said transverse pivot pin in said intermediate slots, means to hold said transverse pivot pin in a selected end of said intermediate slots, and power means to move said dog levers toward and away from each other while said log bites move substantially in a straight vertical line.

12. The dog lever structure of claim 11 characterized in that said power means is a double acting fluid cylinder and piston each having pivot members directly connecting one of them to said upper and the other to said lower dog lever.

13. The dog lever structure of claim 12 characterized in that said power pivot member on said upper dog lever being forward of said link pivot, and said power pivot member on said lower dog lever being forward of said transverse pivot pin in said intermediate slots.

14. The dog lever structure of claim 11 characterized by a crank journaled between said plates in back of said intermediate slots, and a shifting and locking link pivotally connecting said crank and said transverse pivot pin in said intermediate slots to extend and retract said dog levers by the throw of said crank.

15. The dog lever structure of claim 14 characterized in that said crank positions said locking link pivot lower than said crank center to lock the position of said locking link.

References Cited in the file of this patent

UNITED STATES PATENTS

| | | |
|---|---|---|
| 918,152 | Hodgen | Apr. 13, 1909 |
| 936,784 | Krebs | Oct. 12, 1909 |
| 1,561,342 | Martin | Nov. 10, 1925 |
| 1,840,846 | Martin | Jan. 12, 1932 |
| 1,861,867 | Langill et al. | June 7, 1932 |